United States Patent [19]
Hiszpanski

[11] 3,751,077
[45] Aug. 7, 1973

[54] WELDED SLEEVE FITTING

[75] Inventor: Jan A. Hiszpanski, Chicago, Ill.

[73] Assignee: Imperial-Eastman Corporation, Chicago, Ill.

[22] Filed: Feb. 28, 1972

[21] Appl. No.: 229,707

[52] U.S. Cl................. 285/169, 285/286, 285/332, 285/386
[51] Int. Cl............................................. F16l 55/00
[58] Field of Search.................. 285/169, 286, 386, 285/332, 35 A, 12, 31, 32

[56] References Cited
UNITED STATES PATENTS

| | | | |
|---|---|---|---|
| 3,288,494 | 11/1966 | Callahon | 285/354 X |
| 2,984,899 | 5/1961 | Richter et al. | 285/286 X |
| 2,273,017 | 2/1942 | Boynton | 285/286 X |

FOREIGN PATENTS OR APPLICATIONS

| | | | |
|---|---|---|---|
| 562,012 | 8/1958 | Canada | 285/286 |
| 731,198 | 5/1932 | France | 285/332 |
| 1,104,282 | 6/1955 | France | 285/12 |
| 1,321,479 | 2/1963 | France | 285/354 |

*Primary Examiner*—Dave W. Arola
*Attorney*—Axel A. Hofgren et al.

[57] ABSTRACT

A fitting for use with metal tubes adapted for critical applications such as involving high pressure and/or elevated temperatures for heavy external loads. The fitting includes a sleeve which is sealingly welded to the tube end and defines an improved cooperative nut and sleeve structure whereby the nut may be threadedly withdrawn from the body notwithstanding the projection of the sealing weld sufficiently from the tube to prevent complete withdrawal of the nut from the sleeve.

10 Claims, 3 Drawing Figures

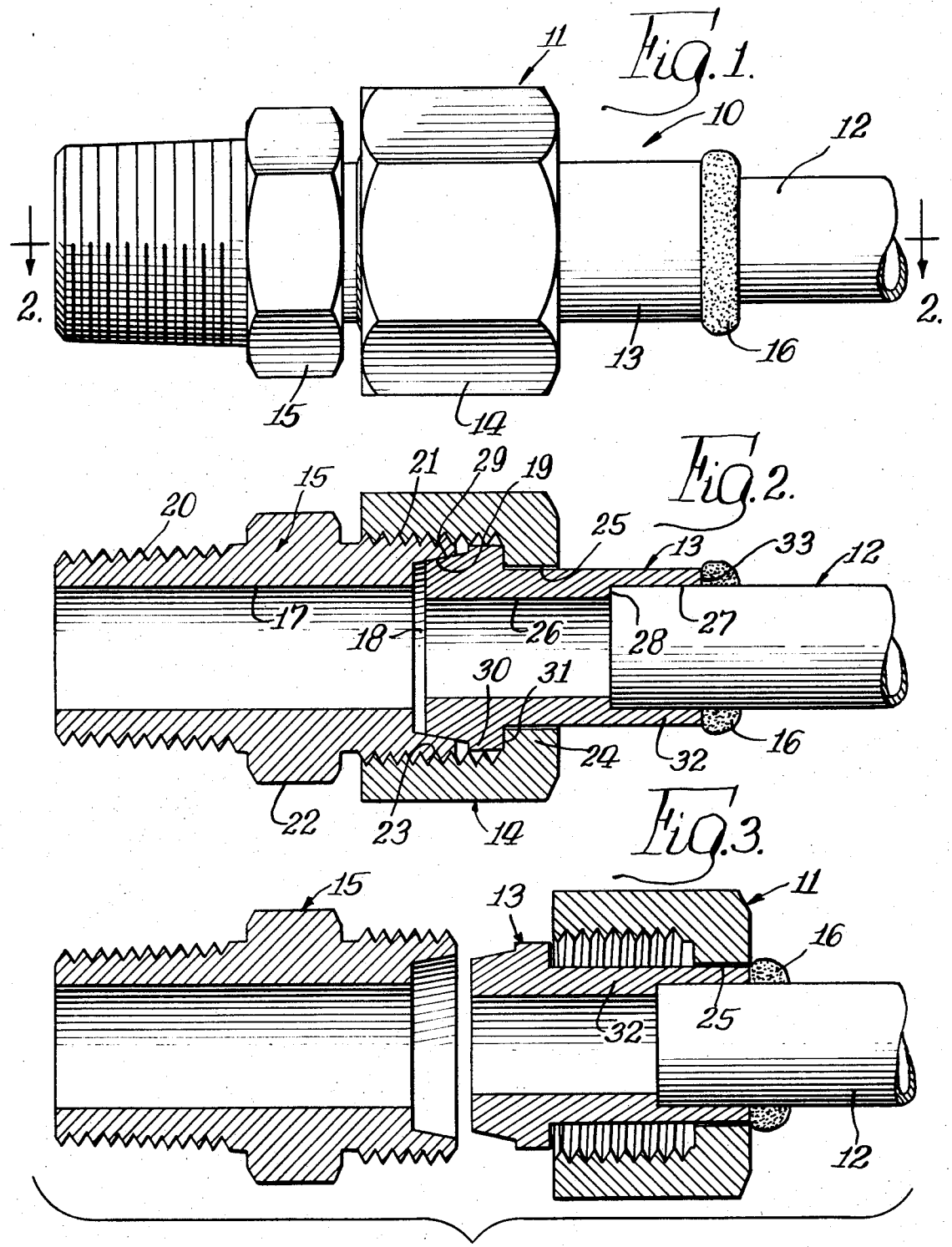

WELDED SLEEVE FITTING

BACKGROUND OF THE INVENTION

1. Field of the Invention

The invention relates to tube couplings and in particular to tube couplings having a sleeve permanently joined to the tube as by welding.

2. Description of the Prior Art

In one conventional form of tube coupling, the tube end is sealingly coupled to the fitting body by means of a sleeve attached to the tube end as by welding. The sleeve, in turn, is sealingly engaged with the fitting body as a result of a force application effected by a nut threaded to the body. In welding the sleeve to the body, a weld bead is formed at the outer end of the sleeve sealingly joining the sleeve thereat to the tube end which projects into the sleeve outer end. In the known fittings of this type, a problem has arisen from time to time in that the weld bead interferes with the removal of the nut from the body causing substantial difficulty in disconnecting the tube from the body when desired.

SUMMARY OF THE INVENTION

The present invention comprehends an improved tube coupling of the above described welded sleeve type wherein the sleeve is arranged in a novel manner to permit free withdrawal of the nut from the body while yet permitting the user to form a substantial weld joint wherein the weld bend may project substantially outwardly from the tube to prevent axial outward movement of the nut therebeyond.

More specifically, the invention comprehends the provision of a tube coupling structure including a body having a port and a threaded portion coaxially of the port, a tubular sleeve having an inner end adapted to sealingly engage the body, and annular radially outer, axially outwardly facing shoulder, and a tubular outer end extending axially outwardly of the shoulder and terminating in a distal end, an annular nut having a threaded portion threadedly connected to the body threaded portion, the nut coaxially encircling the sleeve and having an inturned flange disposed axially outwardly of the sleeve shoulder for engaging the shoulder to urge the sleeve into sealing engagement with the body as an incident of threaded advance of the nut toward the body; a tube end extending coaxially inwardly into the sleeve, and an annular weld between the sleeve distal end and the tube sealingly connecting the sleeve to the tube end and having a radial outer dimension greater than the corresponding radial inner dimension of the nut flange whereby the nut flange is captured axially movably between the sleeve shoulder and the weld in the made-up arrangement of the tube coupling, the length of the sleeve outer end outwardly of the shoulder being preselected to permit withdrawal of the nut axially outwardly of the axially inner end of the sleeve thereby to permit separation of the sleeve and nut from the body with the nut flange maintained radially outwardly of the sleeve outer end.

The sleeve may define a tube stop shoulder within the outer end thereof for limiting the insertion of the tube end thereinto. The nut flange may define an inner cylindrical surface having a diameter only slightly greater than the outer diameter of the sleeve outer end. The bead may define an outer circumference having a diameter throughout greater than the inner diameter of the nut flange.

The length of the sleeve outer end may be sufficient to permit the nut to be spaced outwardly from the body with the sleeve inner end engaging the body. In the illustrative embodiment, the axial length of the nut is no greater than the axial length of the sleeve outer end. The sealing surface of the sleeve inner end may comprise a convex, frustoconical surface received in a complementary concave frustoconical recess in the body. The length of the sleeve outer end may be preselected to permit the separation of the threaded means of the nut and body with the sleeve seating surface received in the concave seating surface of the body.

BRIEF DESCRIPTION OF THE DRAWING

Other features and advantages of the invention will be apparent from the following description taken in connection with the accompanying drawing wherein:

FIG. 1 is a side elevational view of a tube coupling structure embodying the invention;

FIG. 2 is a diametric section thereof; and

FIG. 3 is a diametric section illustrating the arrangement thereof upon disconnection of the tube end from the body.

DESCRIPTION OF THE PREFERRED EMBODIMENT

In the exemplary embodiment of the invention as disclosed in the drawing, a tube coupling structure generally designated 10 is shown to comprise a tube coupling 11 having sealingly secured thereto a tube end 12. The tube coupling 11 includes a sleeve 13, a nut 14, and a body 15. The sleeve is sealingly connected to the tube 12 by a weld 16 at the outer end of the sleeve.

As shown in FIGS. 2 and 3, body 15 may comprise a tubular fitting body having an axial bore 17 opening at the outer end into an enlarged recess 18 defined by a frustoconical outwardly widening seating surface 19. The body may define an outer thread 20 for coupling the body to another element as desired, and an inner thread 21 for threaded engagement with the nut 14. A plurality of flats 22 may be provided on a mid-portion of the body for cooperation with a suitable tool, such as a wrench, in making up the fitting.

Nut 14 comprises a tubular element having an inner female thread 23 and an axially outer inturned flange 24 defining a cylindrical inner surface 25.

Sleeve 13 herein comprises a tubular element having a through bore 26 provided with a radially enlarged outer portion 27 defining at its inner end a stop shoulder 28 for limiting the insertion of tube end 12 into the sleeve. At its inner end, the sleeve defines a frustoconical inwardly narrowing seating surface 29 adapted to have sealing engagement with the seating surface 19 of the body in the made-up arrangement of the fitting. The sleeve further defines a collar portion 30 defining an axially outwardly facing shoulder 31 adapted to be engaged by the nut flange 24 as an incident of threaded advancement of the nut on the body thread 21 as during make-up of the fitting.

The sleeve further defines a tubular outer end 32 extending axially outwardly of the plane of shoulder 31 and terminating in a distal end 33.

Weld 16 may comprise a conventional weld defined by a bead of suitable weld material fused to the distal end 33 of the sleeve and to the outer surface of the tube 12 to define a sealed connection of the tube to the sleeve.

As shown, the weld bead may extend radially outwardly beyond the outer circumference of sleeve end 33 and as best seen in FIG. 3, may have an outer dimension greater than the diameter of nut flange surface 25 whereby the nut is maintained captive on the sleeve in the made-up arrangement of the sleeve and tube end.

As indicated briefly above, the invention comprehends providinG an outer end 32 of the sleeve having an axial length preselected to permit withdrawal of the nut axially outwardly of the axially inner end of the sleeve, thereby to permit separation of the sleeve and nut assembly from the body notwithstanding the maintenance of the nut flange radially outwardly of the sleeve outer end portion 32, as shown in FIG. 3. In the illustrated embodiment, the axial length of the nut is made to be no greater than the axial length of the sleeve 13, and more specifically, as shown in FIG. 3, may be no greater than the axial length of sleeve outer end 32.

The diameter of nut flange surface 25 may be made only slightly greater than the outer diameter of sleeve end portion 32 as there is no need for the nut to be withdrawn axially beyond the weld bead 16 in order to permit disconnection of the tube end from the fitting body 15, as illustrated in FIG. 3. Thus, the present fitting permits make-up and disassembly of the joint in the normal manner notwithstanding the provision of a relatively large weld bead 16 assuring positive sealed connection of the sleeve to the tube. Thus, the coupling 10 is adapted for critical applications involving high pressure, elevated temperature, heavy external loads, and the need for high reliability in maintaining the sealed connection such as required in nuclear industry, power plant, chemical plant, shipyard, pressure testing, etc. applications. The invenin comprehends the use of the disclosed structure in a wide range of coupling sizes as desired.

The application of the weld 16 may be effected by the user and the use of the relatively long sleeve end 32 provides improved facilitated make-up of the fitJing in spacing the point of welding substantially from the seating surface 29, thereby effectively minimizing possiblilty of deformation of the seating surface as from the heat of welding as may occur in the conventional fittings where the weld is made reatively close to the seat end of the sleeve.

In use of the fitting, the user need merely insert the tube end 12 into the sleeve end bore portion 27 into abutment with shoulder 28 with nut 14 installed about the sleeve. The sleeve is then sealingly joined to the tube by the application of the weld 16. The tube end may then be coupled to a suitable male coupling element, such as body 15, having a suitable cooperating threaded portion for use with the nut 14. The axial length of sleeve end portion 32 permits free movement of the nut on the sleeve, notwithstanding the fact that the nut is effectively captured between shoulder 31 and weld bead 16, to permit facilitated make-up and disconnection of the fitting. In connecting the tube to the body, the user threads the nut on body threads 21 suitably to urge nut flange 24 against sleeve shoulder 31 and resultingly seal sleeve seating surface 29 sealingly against body seating surface 19, thereby to complete the sealed make-up of the coupling.

In disconnecting the joint, the user may threadedly withdraw the nut sufficiently to completely disengage the nut from the thread 21 whereupon the seating surface portion 29 may be withdrawn axially from the body recess 18 as desired.

The foregoing disclosure of specific embodiments is illustrative of the broad inventive concepts comprehended by the invention.

I claim:

1. A tube coupling structure comprising: a body having a port and a threaded portion coaxially of said port; a tubular sleeve having an inner end adapted to sealingly engage the body, an annular radially outer, axially outwardly facing shoulder, and a tubular outer end extending axially outwardly of said shoulder and terminating in a distal end; an annular nut having a threaded portion threadedly connected to the body threaded portion, said nut coaxially encircling said sleeve and having an inturned flange disposed axially outwardly of said sleeve shoulder for engaging said shoulder to urge said sleeve into sealing engagement with said body as an incident of threaded advance of said nut toward said body; a tube end extending coaxially inwardly into said sleeve; and an annular weld between said sleeve distal end and said tube sealingly connecting the sleeve to the tube end, said weld and said shoulder having a radial outer dimension greater than the corresponding radial inner dimension of said nut flange whereby said nut flange is captured axially movably between said sleeve shoulder and said weld in the made-up arrangement of the tube coupling, the length of said sleeve outer end outwardly of said shoulder being preselected to permit withdrawal of the nut axially outwardly of the axially inner end of the sleeve thereby to permit separation of said sleeve and nut from said body with said nut flange maintained radially outwardly of said sleeve outer end.

2. The tube coupling structure of claim 1 wherein said sleeve defines an internal tube stop shoulder axially outwardly of said radially outer shoulder limiting the axially inward positioning of the tube end in said sleeve outer end.

3. The tube coupling structure of claim 1 wherein said nut flange is annular.

4. The tube coupling structure of claim 1 wherein the axial length of said nut is no greater than the axial length of said sleeve.

5. The tube coupling structure of claim 1 wherein the axial length of said nut is less than the axial length of said sleeve.

6. The tube coupling structure of claim 1 wherein the length of said sleeve outer end outwardly of said shoulder is sufficient to permit said nut to be spaced outwardly from said body with said sleeve inner end engaging said body.

7. The tube coupling structure of claim 1 wherein said nut has an axial length no greater than the axial length of said sleeve outer end.

8. the tube coupling structure of claim 1 wherein said nut flange has an inner diameter only slightly greater than the outer diameter of said sleeve outer end.

9. The tube coupling structure of claim 1 wherein said body threaded portion defines a male thread.

10. The tube coupling structure of claim 1 wherein said inner end of the sleeve defines a convex seating surface and said body defines a complementary concave seating surface with said sleeve seating surface projecting into said body to sealingly engage said body seating surface in the make-up arrangement of the fitting.

* * * * *